US006832580B2

(12) United States Patent
Marchioro

(10) Patent No.: US 6,832,580 B2
(45) Date of Patent: Dec. 21, 2004

(54) MODULAR CAGE

(75) Inventor: Domenico Marchioro, Castelnovo Di Isola Vicentina (IT)

(73) Assignee: Marchioro S.p.A. Stampaggio Materie Plastiche, Castelnovo di Isola Vicentina (IL)

( * ) Notice: Subject to any disclaimer, the term of this patent is extended or adjusted under 35 U.S.C. 154(b) by 0 days.

(21) Appl. No.: 09/880,144

(22) Filed: Jun. 14, 2001

(65) Prior Publication Data
US 2001/0054394 A1 Dec. 27, 2001

(30) Foreign Application Priority Data

Jun. 23, 2000 (IT) ..................................... PD20000048 U

(51) Int. Cl.[7] .......................... A01K 1/03; A01K 31/06
(52) U.S. Cl. ....................... 119/452; 119/459; 119/461; 119/472; 220/4.33; 220/4.34; 206/512; 206/511; D30/114
(58) Field of Search ............................... 220/4.33, 4.34; 206/509, 512, 511; 119/452, 459, 461, 474, 453, 479, 462, 472, 417; D30/114

(56) References Cited

U.S. PATENT DOCUMENTS

| 1,151,865 A | * | 8/1915 | Clippinger .................. 119/479 |
| 2,759,622 A | * | 8/1956 | Simmons et al. ........... 119/474 |
| 3,407,961 A | * | 10/1968 | Box .......................... 206/511 |
| 3,955,702 A | * | 5/1976 | Lundy ........................ 220/4.28 |
| 4,066,042 A | * | 1/1978 | Bright ........................ 119/453 |
| 4,586,463 A | * | 5/1986 | Braeuner .................... 119/462 |
| 4,909,188 A | * | 3/1990 | Tominaga ................... 119/474 |
| 5,000,121 A | * | 3/1991 | Daily ......................... 119/461 |
| 5,353,738 A | * | 10/1994 | Chiu .......................... 119/461 |
| 5,452,681 A | * | 9/1995 | Ho ............................. 119/461 |
| 5,497,728 A | * | 3/1996 | Watanabe ................... 119/452 |
| 5,533,466 A | * | 7/1996 | Kohus et al. ............... 119/459 |
| 5,996,536 A | * | 12/1999 | King .......................... 119/459 |
| D427,730 S | * | 7/2000 | Powers et al. ............. D30/114 |
| 6,129,052 A | * | 10/2000 | Huang ........................ 119/461 |

FOREIGN PATENT DOCUMENTS

GB 2097234 * 4/1981 .......... A01K/31/06

* cited by examiner

Primary Examiner—Peter M. Poon
Assistant Examiner—Andrea M. Valenti
(74) Attorney, Agent, or Firm—Guido Modiano; Albert Josif; Daniel O'Byrne

(57) ABSTRACT

A modular cage comprising first and second profiled elements connected by interlocking corner joints for reversible joining so as to constitute a supporting frame and grille-like wall elements connected to the frame to constitute the cage, with the corner joints comprising each a corner body from which tangs extend monolithically and at right angles, the tangs being provided with reversible locking devices which enter corresponding first longitudinally elongated seats formed in the profiled elements.

13 Claims, 7 Drawing Sheets

MODULAR CAGE

BACKGROUND OF THE INVENTION

The present invention relates to a modular cage.

It is known that many small animals, such as birds, rodents etcetera, are kept in cages.

Numerous cages of the most disparate types are currently commercially available, but they all lack flexibility both from the point of view of production as well as of construction.

Moreover, they are usually sold assembled (generally they are constituted by metallic elements welded together), and this causes problems in space management from a logistic standpoint (storage, transport, etcetera) owing to their sometimes considerable dimensions.

SUMMARY OF THE INVENTION

The aim of the present invention is to provide a modular cage whose structure has characteristics of modularity and easy use and construction.

Within this aim, an object of the present invention is to provide a modular cage whose assembly does not entail technical skills and therefore can optionally be entrusted to the user.

Another object of the present invention is to provide a cage whose structure, while being modular and standardized in relation to its components, is highly flexible in order to meet the most disparate requirements of application.

Another object of the present invention is to provide a cage which has a particularly sturdy structure which is suitable even for operating conditions in which it is subjected to intense stresses.

Another object of the present invention is to provide a cage whose structure can also optionally be produced with high-level aesthetics and styling features.

Another object of the present invention is to provide a modular cage whose structure can be manufactured with known equipment and technologies.

This aim and these and other objects which will become better apparent hereinafter are achieved by a modular cage, characterized in that it comprises a frame which is constituted by profiled elements connected by interlocking corner joints, said frame being associated with grille-like wall elements, each one of said joints comprising a corner body from which tangs extend monolithically and at right angles, said tangs being provided with reversible locking devices adapted to enter corresponding first longitudinally elongated seats formed in said profiled elements.

Advantageously, the frame is associated, at the bottom, with a drawer-like body which constitutes the bottom of the cage.

BRIEF DESCRIPTION OF THE DRAWINGS

Further characteristics and advantages of the present invention will become better apparent from the following description of some embodiments thereof which are illustrated only by way of non-limitative example in the accompanying drawings, wherein.

DESCRIPTION OF THE PREFERRED EMBODIMENTS

Figure 1:
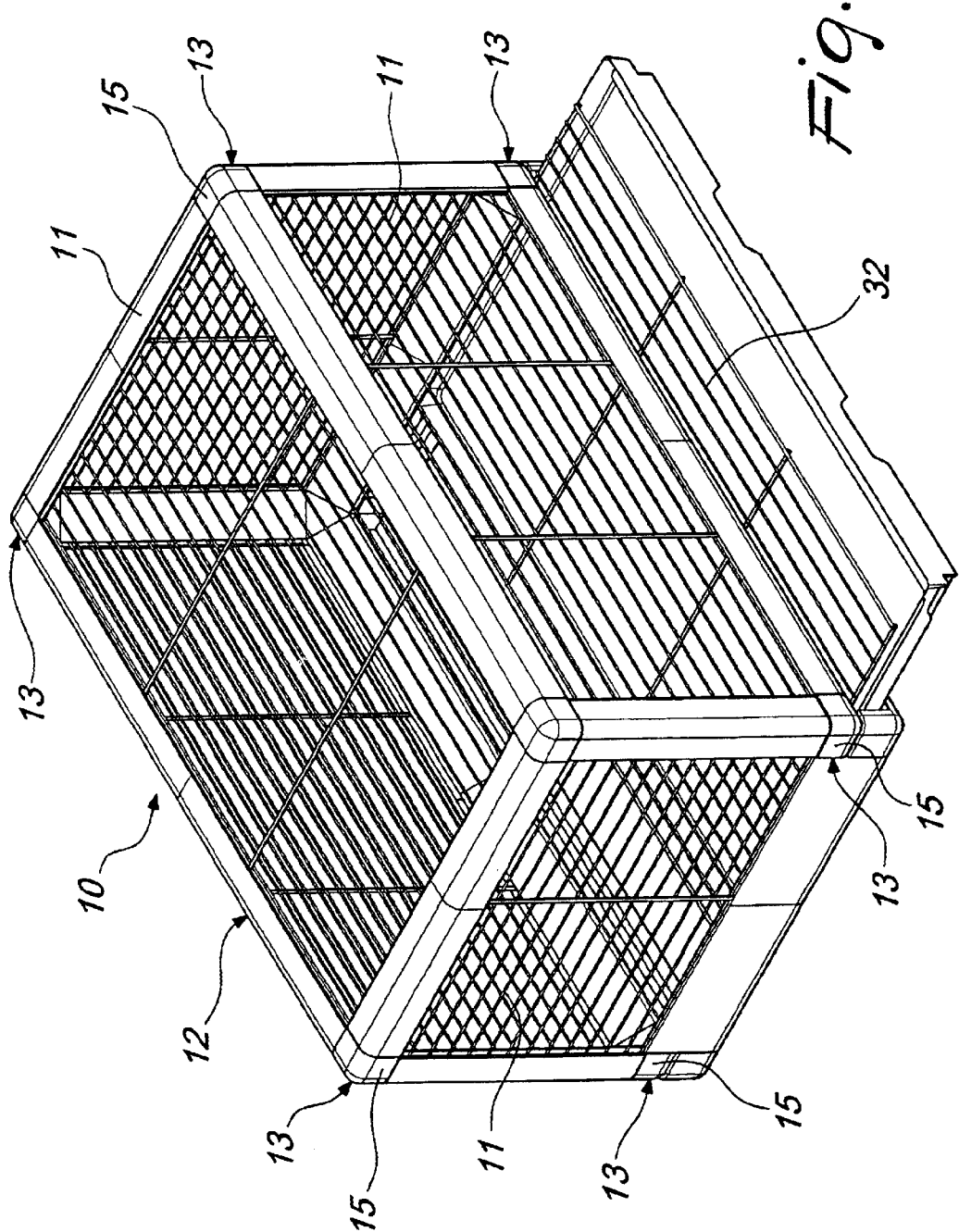
FIG. 1 is a perspective view of a cage having the structure according to a first embodiment of the invention.
Figure 2:
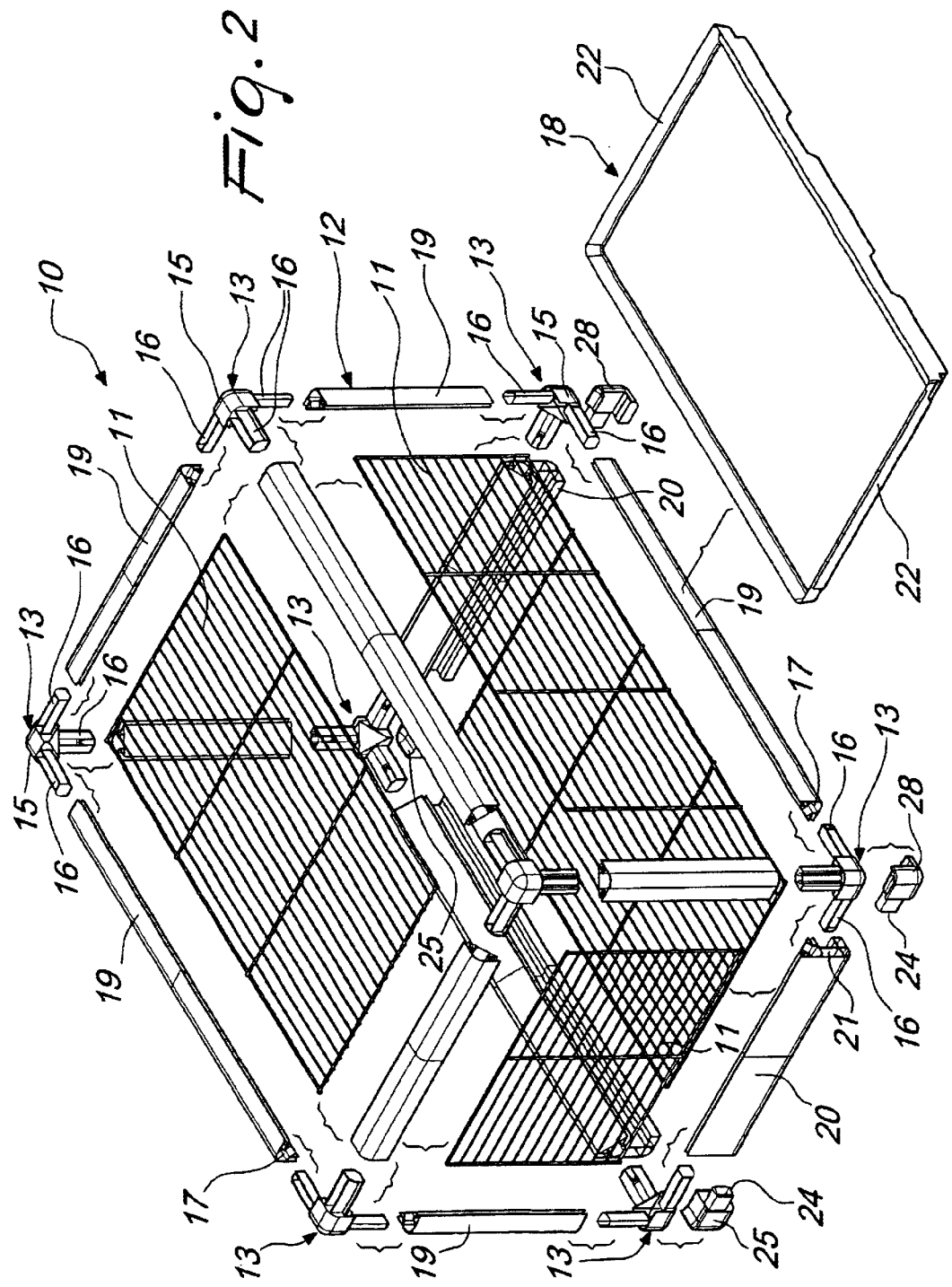
FIG. 2 is an exploded view of the cage of FIG. 1.
Figure 3:
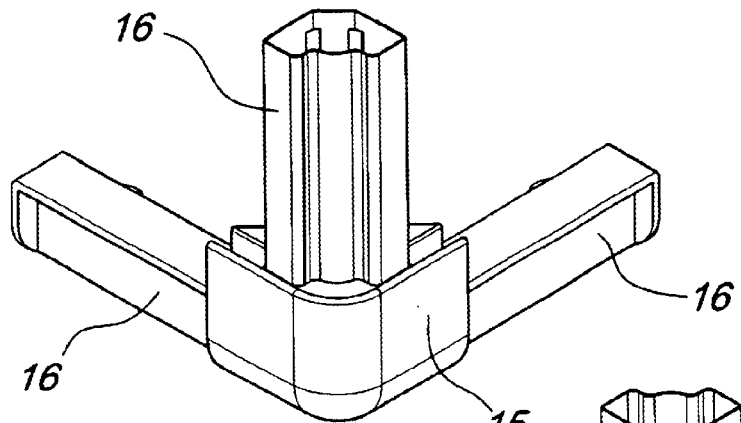
FIGS. 3 to 9 are perspective views of various components of the cage of FIG. 1.
Figure 4:
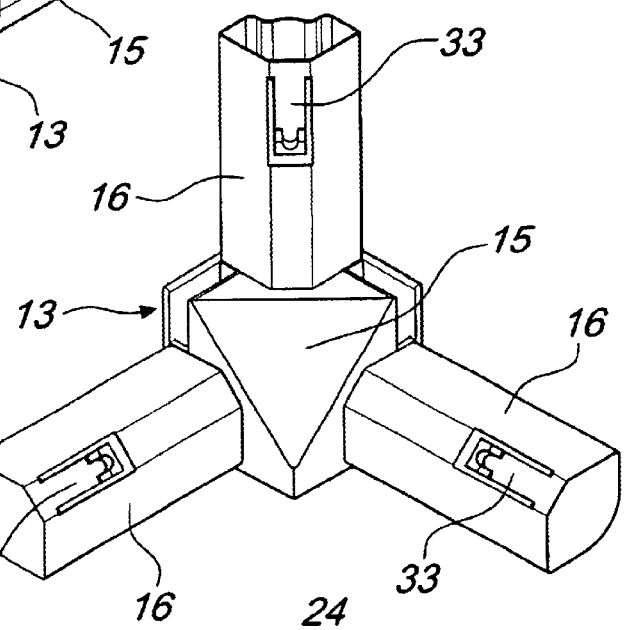
Figure 5:
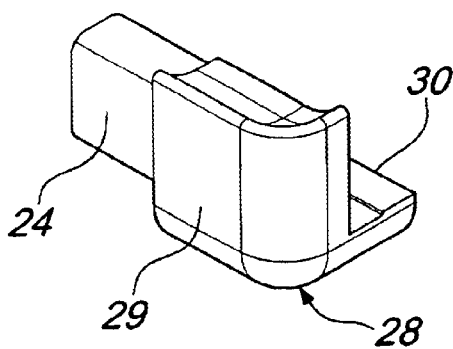
Figure 6:
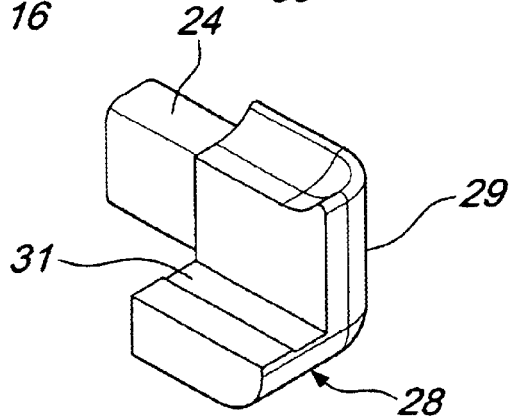
Figure 7:
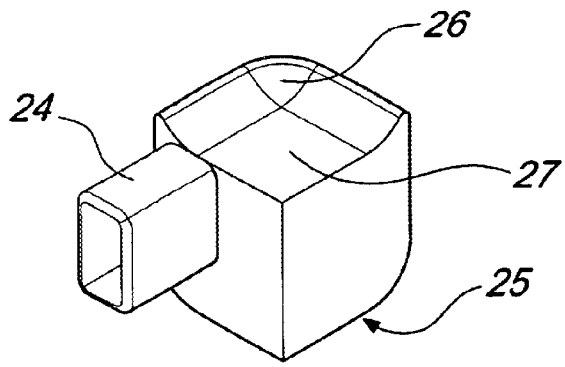

With particular reference to FIGS. 1 to 9, a modular cage having the structure according to a first embodiment of the invention is generally designated by the reference numeral 10.

The cage 10 comprises a frame, generally designated by tho reference numeral 12, which is associated with metallic grille-like wall elements 11 and is constituted by profiled tubular elements, specified hereinafter, which are connected by interlocking corner joints 13.

Each one of the corner joints 13 comprises a corner body 15 from which tangs 16 (see FIG. 2) protrude monolithically and at tight angles; the tangs are provided with reversible locking devices, described in greater detail hereinafter, which are adapted to enter corresponding first longitudinally elongated seats 17 formed in the tubular elements.

The frame 12 is associated, at the bottom, with a drawer-like body, generally designated by the reference numeral 18, which constitutes the bottom of the cage 10.

In particular, the frame 12 comprises first profiled tubular elements 19 which have the first seat 17 and whose surfaces are shaped substantially complementary to the tangs 16 of the corresponding joint 13.

The frame 12 further comprises second profiled tubular elements 20 which in this case are arranged at the bottom and have, in addition to the first seat 17, a second seat 21 which is longitudinally open and adapted to form guides for the sliding of the shaped sides 22 of the drawer-like body 18.

Figure 8:
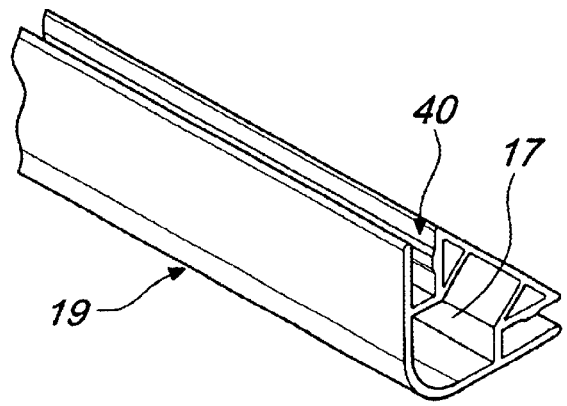
Figure 9:
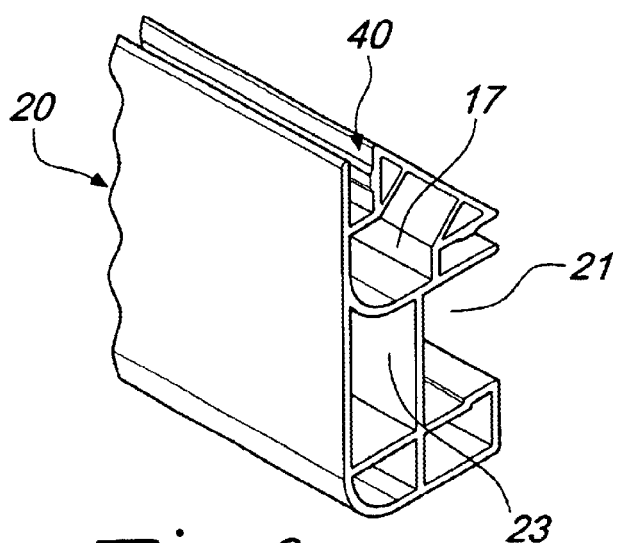

Both the first 19 and the second 20 profiled elements have, as clearly shown in FIGS. 8 and 9, additional supporting seats 40 adapted to removably accommodate and retain therein the grill-like wall elements.

In particular, the second tubular elements 20 also comprise a third seat 23 for the insertion and locking of tangs 24 which are fixed monolithically to shaped end plugs.

More specifically, in this case, the cage 10 comprises two first plugs 25 which are substantially constituted by a corner block 26 provided with a tubular tang 27.

The frame 12 also comprises two second plugs 28 which are also constituted by a block 29 from which a tubular tang 30 protrudes.

Each one of the second plugs 28 is provided, at the corresponding block 29, with a shape which is suitable to form a recess 31 which is in turn suitable to extend the corresponding second seat 21 for guiding the drawer-like body 18.

In particular, the drawer-like body 18 in this case is of the type with trays having sides 22 shaped complementary to the surfaces of the second seats 21 and are surmounted by a grille-like panel 32.

In this embodiment, the locking devices related to the tangs 16 of the joints 13 are constituted, for each one of the tangs 16, by a corresponding monolithic elastic tongue 33 which is adapted to enter, by interlocking therein, suitable slots formed in the corresponding profiled elements.

Figure 10:
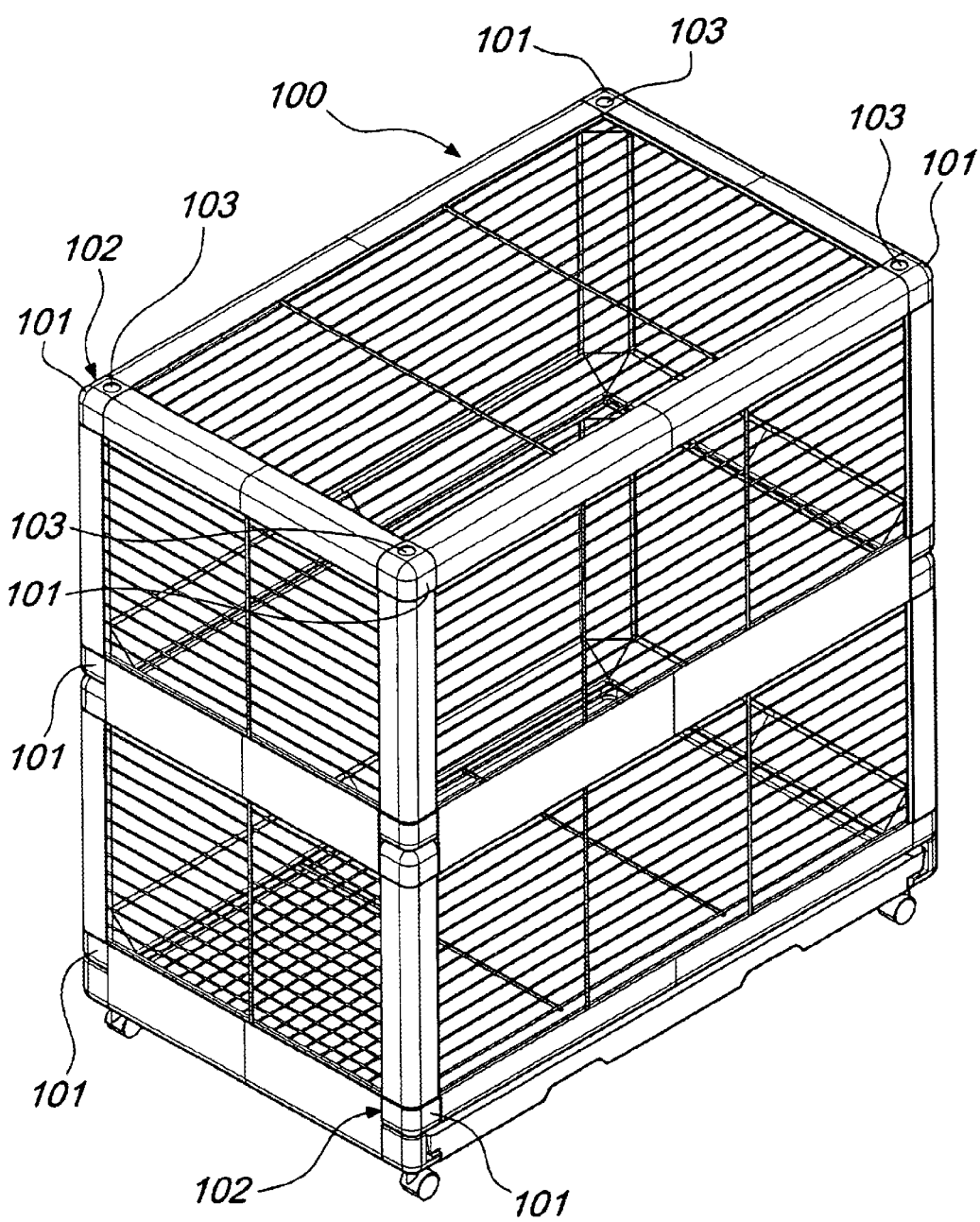
FIG. 10 is a perspective view of a second embodiment of the cage of FIG. 1.
Figure 11:
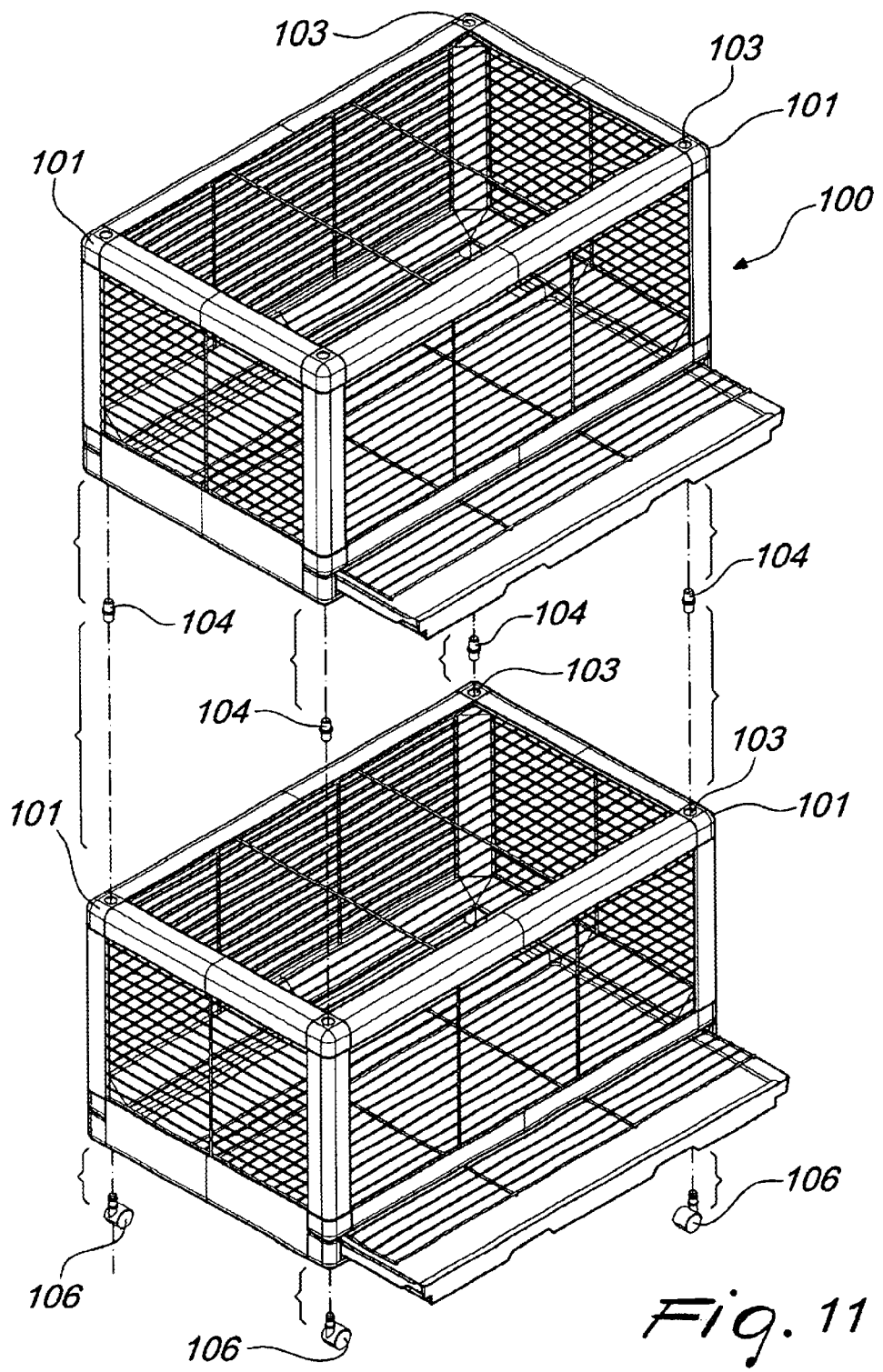
FIG. 11 is a perspective exploded view of the embodiment shown in FIG. 10.
Figure 13:
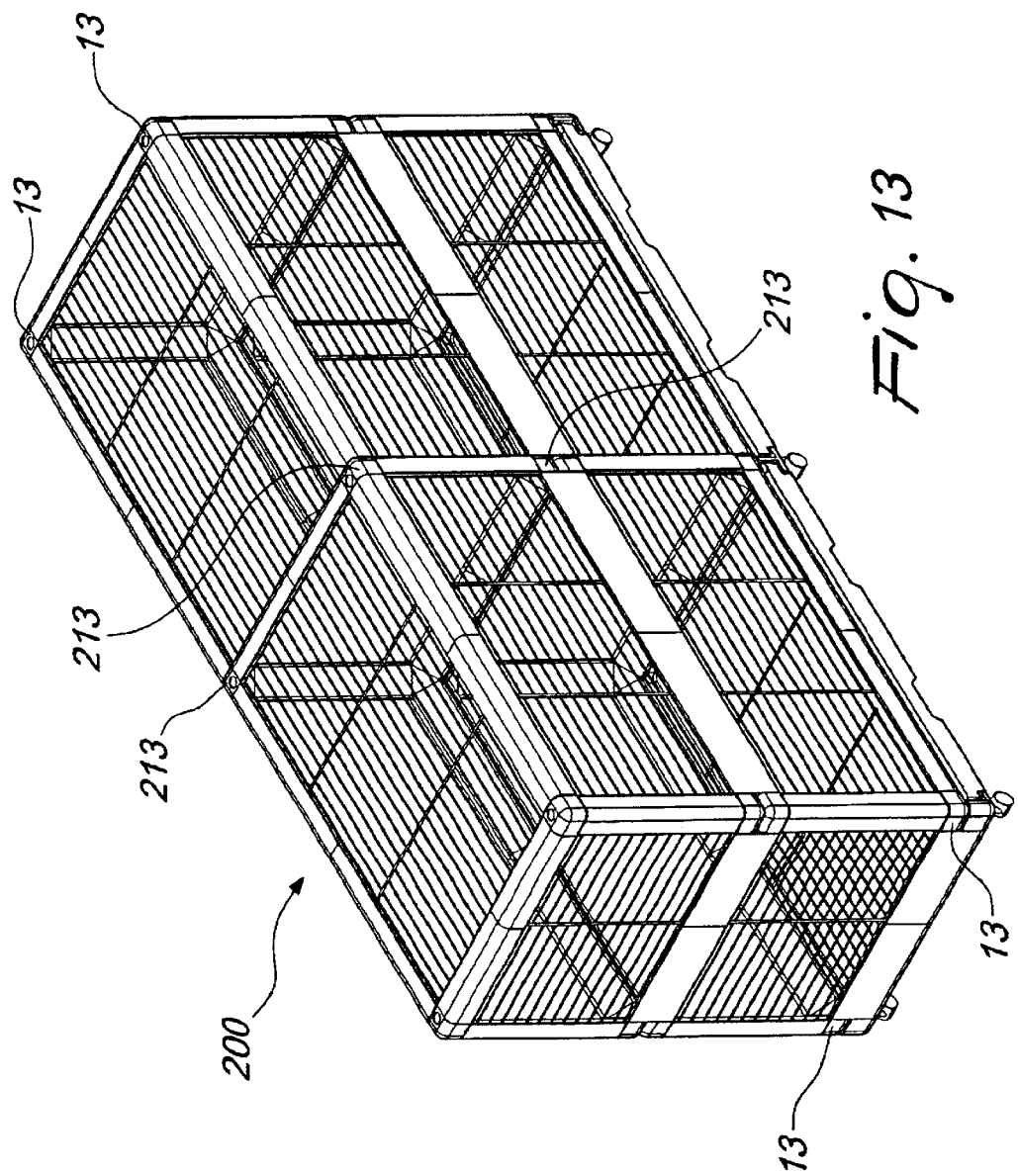
FIG. 13 is a perspective view of a third embodiment of the cage according to the invention.

With particular reference to FIGS. 9 to 11, a second embodiment of the cage 10 is generally designated by the reference numeral 100.

The modular cage 100 does not differ in any way from the previously described cage 10, except in that at the body, here designated by the reference numeral 101, of the joints, here designated by the reference numeral 102, dead holes 103 are formed which are suitable to accommodate and fix corresponding connection components or accessories.

More specifically, in this case the cage 100 has, as its components, pins 104 with a central flange 105 which are adapted to provide reversible stacking connections for modules which are substantially constituted by cages which are fully similar to the one described above and designated by the reference numeral 10.

Moreover, the holes can accommodate, at the bottom, auxiliary components such as castors 106 which are suitable to provide wheeled support for the entire cage 100.

Figure 12:
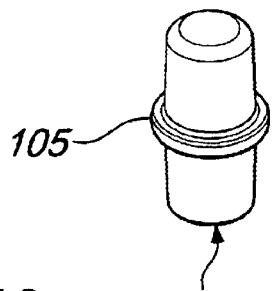
FIG. 12 is a perspective view of a component of the embodiment of FIG. 10.

With particular reference to FIG. 12, a third embodiment of the cage 10 is generally designated by the reference numeral 200.

In this case, by means of joints 213 which differ from the ones designated by the reference numeral 13 in that they have four tangs 16 instead of three, it is clearly shown that it is possible to arrange a plurality of cages such as 10 so that they are not only stacked but also superimposed.

In practice it has been found that the present invention has achieved the intended aim and objects.

In particular, attention is drawn to its constructive simplicity, which however never detracts from the flexibility and functional sturdiness of the cage having the structure according to the invention.

The cage having the structure according to the invention can in fact meet the most disparate application requirements, adapting easily to the most disparate configurations, which in any case can be assembled simply and rapidly by the user, since the assembly of said cage requires no particular technical knowledge.

In particular, it should be noted that the components that constitute the cage having the structure according to the invention can be easily standardized, achieving considerable savings in production costs.

It should also be noted that the overall neat appearance of the cage having the structure according to the invention allows to provide optional embodiments thereof having good aesthetic and styling features.

The present invention is susceptible of modifications and variations within the scope of the appended claims.

The technical details may be replaced with other technically equivalent elements.

The materials and the dimensions may be any according to requirements.

The disclosures in Italian Utility Model Application No. PD2000U000048 from which this application claims priority are incorporated herein by reference.

What is claimed is:

1. A modular cage, comprising:

corner joints having a corner body and at least three tangs that protrude at right angles from said corner body;

reversible locking devices provided at said tangs;

first profiled elements, comprising first seats which have surfaces thereof shaped complementary to the tangs, said tangs being insertable with said reversible locking devices in said first seats for interlocking;

second profiled elements comprising first seats which have surfaces thereof shaped complementary to the tangs, said tangs being insertable with said reversible locking devices in said first seats for interlocking;

grill-like wall elements;

additional supporting seats provided both at said first and second profiled elements;

said grill-like wall elements being removably accommodated and retained in said additional supporting seats and said first and second profiled elements being removably connected to each other and interlocked by way of said corner joints so as to form a supporting frame on which said grill-like wall elements are removably supported so as to form said cage; and auxiliary connection components, each one of said corner bodies of said corner joints being provided with a dead hole for accommodating a respective one of said auxiliary connecting components.

2. The cage of claim 1, wherein said first and second profiled elements are substantially tubular.

3. The cage of claim 1, further comprising a drawer-like body which is slidingly insertable at a lower part of said frame so as to constitute a bottom of the cage.

4. The cage of claim 3, wherein said second profiled elements are arranged at the lower part of the frame and comprise respective second seats which are open and arranged longitudinally along said second profiled elements so as to form sliding guides for said drawer-like body.

5. The cage according to claim 4, further comprising first and second contoured end plugs which are provided with respective tangs, said second profiled elements comprising respective third seats in which said tangs of said contoured end plugs are inserted and locked.

6. The cage of claim 5, comprising at least two said first end plugs which are constituted each by a corner block, said tangs being tubular and monolithic with said corner block and protruding therefrom.

7. The cage according to claim 6, comprising at least two said second end plugs which are constituted by a corner block, said tangs being tubular and monolithic with said corner block and protruding therefrom, said corner block further comprising a recess which is arranged so as to provide an extension of a corresponding one of said second seats providing said sliding guides for the drawer-like body.

8. The cage according to claim 4, wherein said drawer-like body is constituted by a tray with sides shaped complementary to surfaces of said second seats, and by a grille-like panel which surmounts said sides.

9. The cage according to claim 1, wherein said reversible locking devices are constituted each by an elastic tongue provided monolithic with a respective one of said tangs and by a slot formed in a corresponding one of said first and second profiled elements, said tongue being adapted to enter, with a reversible interlocking action, a respective slot.

10. The cage of claim 1, wherein said corner joints are provided with at least one additional tang for connection to additional frames arranged side by side to provide modular extension of the cage.

11. The cage according to claim 1, wherein said auxiliary connection components comprise pins provided with an intermediate flange, said pins being each accommodatable in the dead hole of a respective one of said corner joints so as to allow modular stacked extension of the frames.

12. The cage according to claim 1, wherein said auxiliary connection components comprise wheels, of the castor type, with a pin-shaped tang to provide wheeled support for the cage.

13. A modular cage, comprising:

corner joints having a corner body and at least three tangs that protrude at right angles from said corner body;

reversible locking devices provided at said tangs;

first profiled elements, comprising first seats which have surfaces thereof shaped complementary to the tangs, said tangs being insertable with said reversible locking devices in said first seats for interlocking;

second profiled elements comprising first seats which have surfaces thereof shaped complementary to the tangs, said tangs being insertable with said reversible locking devices in said first seats for interlocking;

grill-like wall elements;

additional supporting seats provided both at said first and second profiled elements; said grill-like wall elements being removably accommodated and retained in said additional supporting seats and said first and second profiled elements being removably connected to each other and interlocked by way of said corner joints so as to form a supporting frame on which said grill-like wall elements are removably supported so as to form said cage; and first and second contoured end plugs which are provided with respective tangs, said second profiled elements comprising respective third seats in which said tangs of said contoured end plugs are inserted and locked.

* * * * *